US008880504B2

(12) United States Patent
Saeki

(10) Patent No.: US 8,880,504 B2
(45) Date of Patent: Nov. 4, 2014

(54) TAG MANAGEMENT DEVICE, SYSTEM AND RECORDING MEDIUM

(75) Inventor: Toshiaki Saeki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/594,917

(22) Filed: Aug. 27, 2012

(65) Prior Publication Data

US 2013/0066849 A1 Mar. 14, 2013

(30) Foreign Application Priority Data

Sep. 8, 2011 (JP) .................................. 2011-196503

(51) Int. Cl.
*G06F 17/30* (2006.01)
(52) U.S. Cl.
CPC .............................. *G06F 17/30908* (2013.01)
USPC ............................ 707/714; 707/737; 707/747
(58) Field of Classification Search
CPC .................... G06F 17/30083; G06F 17/30029; G06F 17/30477; G06F 17/30595; G06F 17/30985
USPC ......................................... 707/714, 737, 747
See application file for complete search history.

(56) References Cited

U.S. PATENT DOCUMENTS

| | | | | |
|---|---|---|---|---|
| 6,182,286 | B1 * | 1/2001 | Sigal et al. ..................... | 717/122 |
| 7,457,799 | B2 * | 11/2008 | Nagata et al. ......................... | 1/1 |
| 7,519,903 | B2 * | 4/2009 | Yahagi ........................... | 715/234 |
| 8,392,435 | B1 * | 3/2013 | Yamauchi ...................... | 707/749 |
| 2003/0065717 | A1 * | 4/2003 | Saito et al. ..................... | 709/203 |
| 2004/0004640 | A1 * | 1/2004 | Iida ................................ | 345/810 |
| 2005/0225551 | A1 * | 10/2005 | Shimizu et al. ................ | 345/419 |
| 2006/0206680 | A1 * | 9/2006 | Yamanaka et al. ............. | 711/170 |
| 2007/0106844 | A1 * | 5/2007 | Ohkawa ......................... | 711/130 |
| 2008/0022290 | A1 * | 1/2008 | Ochiai et al. ................... | 719/315 |
| 2011/0167095 | A1 * | 7/2011 | Sato ............................... | 707/812 |
| 2011/0252039 | A1 * | 10/2011 | White ............................. | 707/741 |

FOREIGN PATENT DOCUMENTS

| | | | | |
|---|---|---|---|---|
| JP | 2002-108850 | | 4/2002 | |
| JP | 2004-038512 | | 2/2004 | |
| JP | 2004038512 | A * | 2/2004 | ............. G06F 17/30 |
| JP | 2005-070911 | | 3/2005 | |

* cited by examiner

*Primary Examiner* — Hosain Alam
*Assistant Examiner* — Ahmed Abraham
(74) *Attorney, Agent, or Firm* — Fujitsu Patent Center

(57) ABSTRACT

A tag management device executes a process including adding, to data received, sort-free identifiers that identifies receiving order, and are monotonically increasing or monotonically decreasing numbers or character strings arranged in alphabetical order or a combination thereof; storing, sequentially in a first storing unit associated with a tag that is added to the received data, the identifiers added at the adding; storing, sequentially in a second storing unit in an associated manner, the received data and the identifiers added at the adding; and searching, when a storing unit associated with a tag to be searched for is the first storing unit, data associated with the tag to be searched for by joining, using an inner join or an outer join, information stored in the first storing unit and information stored in the second storing unit.

11 Claims, 12 Drawing Sheets

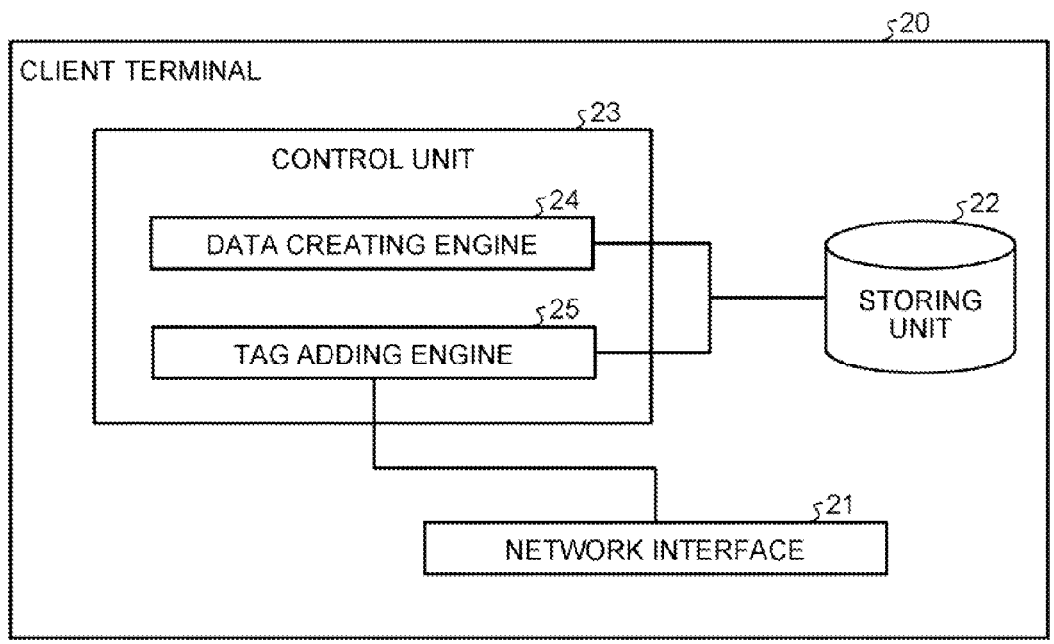

FIG.5

| "DAY-OF-WEEK AND TIME: MONDAY 9:00-10:00" | | "LOCATION: A PREFECTURE, B CITY, C TOWN" | | | |
|---|---|---|---|---|---|
| "DAY-OF-WEEK AND TIME: TUESDAY 12:00-13:00" | UE UE UE | "LOCATION: A PREFECTURE, E CITY, F WARD" | UE UE UE | "ROAD: CONGESTION" | |
| KEY | VALUE | KEY | VALUE | KEY | VALUE |
| 00003879 | TRUE | 00003879 | TRUE | 00000026 | TRUE |
| 00037192 | TRUE | 00267112 | TRUE | 00003879 | TRUE |
| ... | ... | ... | ... | ... | ... |

FIG.6

| KEY | VALUE |
|---|---|
| 00000001 | EVENT A |
| ... | ... |
| 00003879 | EVENT B |
| ... | ... |

TAG MANAGEMENT DEVICE, SYSTEM AND RECORDING MEDIUM

CROSS-REFERENCE TO RELATED APPLICATION

This application is based upon and claims the benefit of priority of the prior Japanese Patent Application No. 2011-196503, filed on Sep. 8, 2011, the entire contents of which are incorporated herein by reference.

FIELD

The embodiments discussed herein are directed to a tag management device and a tag management program.

BACKGROUND

There is a conventionally used tag search system that performs tagging of data and accumulates the tagged data. With this tag search system, when searching for accumulated data, the data is searched for by specifying a condition using a tag. A Structured document that manages tags and document data in an associated manner is known as a technology for using such a tag search system.

When searching a structured document for a tag, there is a known technology for increasing the processing speed for searching for the tag by compressing the amount of memory or reducing the number of nodes in a tree structure by combining multiple tags into a single tag. Furthermore, there is also a known technology for performing searching while sequentially reading a predetermined amount of text data in a structured document and switching the searching for a tag and a keyword in the tag.

In addition to the structured documents, if a tag is specified on a screen displayed in the Hyper Text Markup Language (HTML) browser, there is also a known tag search system that searches the screen for a tag and displays data corresponding to the searched tag.

Patent Document 1: Japanese Laid-open Patent Publication No. 2002-108850

Patent Document 2: Japanese Laid-open Patent Publication No. 2005-070911

Patent Document 3: Japanese Laid-open Patent Publication No. 2004-038512

However, with the related technology, when searching for large scale tagged data, such as sensor data or a lifelog to which data is sequentially added, random access occurs. Accordingly, there is a problem in that search performance is degraded.

In general, because servers or the like do not retain, in memories, large scale tagged data, the servers retain the data in a disk by using, for example, a database management system (DBMS). If the servers or the like search the large scale tagged data for data that is associated with a specified tag, the servers or the like search for the data by using random access. Accordingly, if a large number of search requests occurs, a large number of random accesses to a disk occurs, and thus it takes a long time to transmit a search result as a response.

SUMMARY

According to an aspect of the embodiments, a tag management device includes a memory; and a processor coupled to the memory, wherein the processor executes a process including: adding, to data received, sort-free identifiers which identifies receiving order, and are monotonically increasing or monotonically decreasing numbers or character strings arranged in alphabetical order or a combination thereof; storing, sequentially in a first storing unit associated with a tag that is added to the received data, the identifiers added at the adding; storing, sequentially in a second storing unit in an associated manner, the received data and the identifiers added at the adding; and searching, when a storing unit associated with a tag to be searched for is the first storing unit, data associated with the tag to be searched for by joining, using an inner join or an outer join, information stored in the first storing unit and information stored in the second storing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a functional block diagram illustrating the configuration of a client terminal according to a second embodiment;

FIG. 3 is a schematic diagram illustrating an example of a message transmitted from the client terminal to a tag management server;

FIG. 5 is a schematic diagram illustrating an example of a tag table;

FIG. 6 is a schematic diagram illustrating an example of information stored in a data table;

DESCRIPTION OF EMBODIMENTS

Preferred embodiments will be explained with reference to accompanying drawings. Incidentally, the present invention is not limited to the embodiments.

[a] First Embodiment

Figure 1:
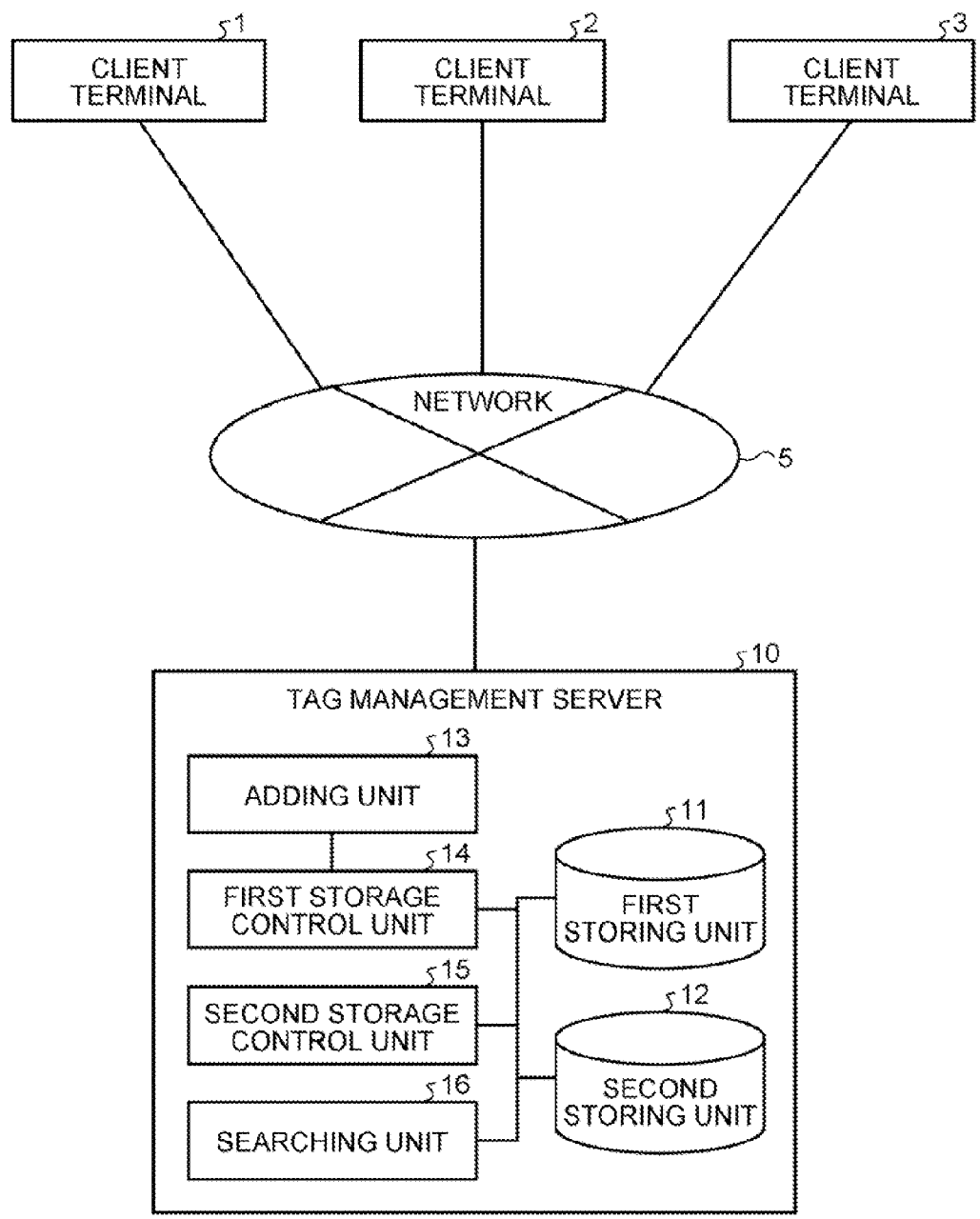
FIG. 1 is a schematic diagram illustrating an example of the overall configuration of a system according to a first embodiment.

FIG. 1 is a schematic diagram illustrating an example of the overall configuration of a system according to a first embodiment. In the system illustrated in FIG. 1, a client terminal 1, a client terminal 2, a client terminal 3, and a tag management server 10 are connected via a network 5 such that they can communicate with each other. In this system, each client terminal transmits tagged data to the tag management server 10, and the tag management server 10 manages the tagged data. The number of devices or the like is only for an example and is not limited thereto.

The client terminal 1, the client terminal 2, and the client terminal 3 are computer devices that request the tag management server 10 to write data or to search data. For example, each client terminal creates a message, in which a tag is added to data obtained by arithmetic processing or the like, and transmits the created message to the tag management server 10. Furthermore, each client terminal creates a message in which a tag is added to data, such as a lifelog received from an external device, and transmits the created message to the tag management server 10. Examples of an external device include a device that is mounted on a vehicle and that transmits traffic information to a client terminal and a device that measures temperature or humidity and that transmits it to a client terminal.

The tag management server 10 is a server device that includes a first storing unit 11, a second storing unit 12, an adding unit 13, a first storage control unit 14, a second storage control unit 15, and a searching unit 16 and that manages, using these units, data received from each client terminal.

The adding unit 13 adds, to data received from the client terminals 1 to 3, sort-free identifiers, such as monotonically increasing or decreasing numbers or character strings arranged in alphabetical order such that the receiving order can be identified. The first storage control unit 14 sequentially stores, in the first storing unit 11 associated with a tag that is added to the received data, an identifier that is added by the adding unit 13. The second storage control unit 15 associates the received data with the identifier added by the adding unit 13 and sequentially stores the data associated with the identifier in the second storing unit 12. At this time, in both tables, identifiers to be added are added to the end of the table. If a storing unit associated with a tag to be searched for is the first storing unit 11, the searching unit 16 joins information stored in the first storing unit 11 and information stored in the second storing unit 12 by using an inner join or an outer join and searches for data associated with the tag to be searched for.

In this way, the tag management server 10 adds sort-free identifiers, such as monotonically increasing or decreasing numbers or character strings arranged in alphabetical order such that the receiving order can be identified, and stores the tags of the received data and the identifiers in the order they are received. Furthermore, the tag management server 10 associates the identifiers with the received data and stores therein the data in the order the data is received. Accordingly, if a tag to be searched for is specified by a client or the like, the tag management server 10 can specify data in both a tag table associated with the tag to be searched for and a data table by using a join method in which the matching of identifiers is used as a condition. If a sort merge join method is used as the join method, because a table is made up of monotonically increasing identifiers in only a write-once mode, the table has been sorted using the identifiers. Accordingly, by skipping a step for sorting in the sort merge join, data can be specified at the step of the merging. Accordingly, all random accesses that possibly occur at the time of sorting can be prevented. Therefore, even if data is stored in a hard disk due to large amount of data, the tag management server 10 can suppresses the occurrence of the random access, thus improving the search performance.

[b] Second Embodiment

In the following, the configuration of the client terminals 1 to 3 and the tag management server 10 described in the first embodiment, the flow of a process, and the like will be described. Because the client terminals illustrated in FIG. 1 have the same configuration, a description thereof will be given by using a client terminal 20. Furthermore, because the tag management server 10 has a function other than that described in the first embodiment, a description thereof will be given by using a tag management server 30 in the second embodiment.

Configuration of the Client Terminal

FIG. 2 is a functional block diagram illustrating the configuration of a client terminal according to a second embodiment. As illustrated in FIG. 2, the client terminal 20 includes a network interface 21, a storing unit 22, and a control unit 23. The control unit included in the client terminal 20 is not limited thereto. For example, an input unit, such as a mouse, a display unit, such as a display, or a storage media reader that reads data from a storage medium may also be included.

The network interface 21 is, for example, a network interface card (NIC) that controls communication with another device. The network interface 21 receives, from an external device, various data, such as sensor data or a lifelog, and transmits a message to the tag management server 10. The storing unit 22 is a storage device that stores therein programs or data executed by the control unit 23. The storing unit 22 is a storage device, such as a semiconductor memory device or a hard disk.

The control unit 23 is a processing unit that performs the overall control of the client terminal 20 by executing an operating system (OS) and is an electronic circuit, such as a central processing unit (CPU). The control unit 23 includes a data creating engine 24 and a tag adding engine 25 and transmits, using these engines, a message to the tag management server 30.

The data creating engine 24 is a processing unit that creates data to be transmitted. For example, the data creating engine 24 executes an application or the like, creates data, and outputs the created data to the tag adding engine 25. Furthermore, if the data creating engine 24 receives data from an external device, the data creating engine 24 outputs the received data to the tag adding engine 25.

The tag adding engine 25 is a processing unit that determines a tag to be added to data received from the data creating engine 24, creates a message in which the determined tag is added to the data, and transmits the data to the tag management server 30. The tag adding engine 25 may also add a fixed tag, such as a unique number of a client or the location at which a sensor is arranged. Furthermore, the tag adding engine 25 may also use, as a tag, information by referring to the contents of data and dynamically selecting the information that specifies the contents of the data.

FIG. 3 is a schematic diagram illustrating an example of a message transmitted from the client terminal to a tag management server. In this example, a description will be given of a case in which a client terminal transmits traffic information, such as congestion information. As illustrated in FIG. 3, in a message transmitted by the client terminal, a "tag" and "data" are associated. The "tag" indicates the tag (taggs) added by the tag adding engine 25 and the "data" indicates the data transmitted to the tag adding engine 25 by the data creating engine 24. The data is, for example, latitude, longitude, time, and altitude that are output from a global positioning system (GPS); however, in FIG. 3, to simplify the explanation, the data is described as an event.

In the example illustrated in FIG. 3, "day-of-week and time: Monday 9:00-10:00" and "location: A Prefecture, B City, C Town" are added to an "event A" as a tag. Furthermore, "day-of-week and time: Tuesday 12:00-13:00", "location: A Prefecture, E City, F Street", and "road: congestion" are added to an "event B" as a tag.

[Configuration of the Tag Management Server]

Figure 4:
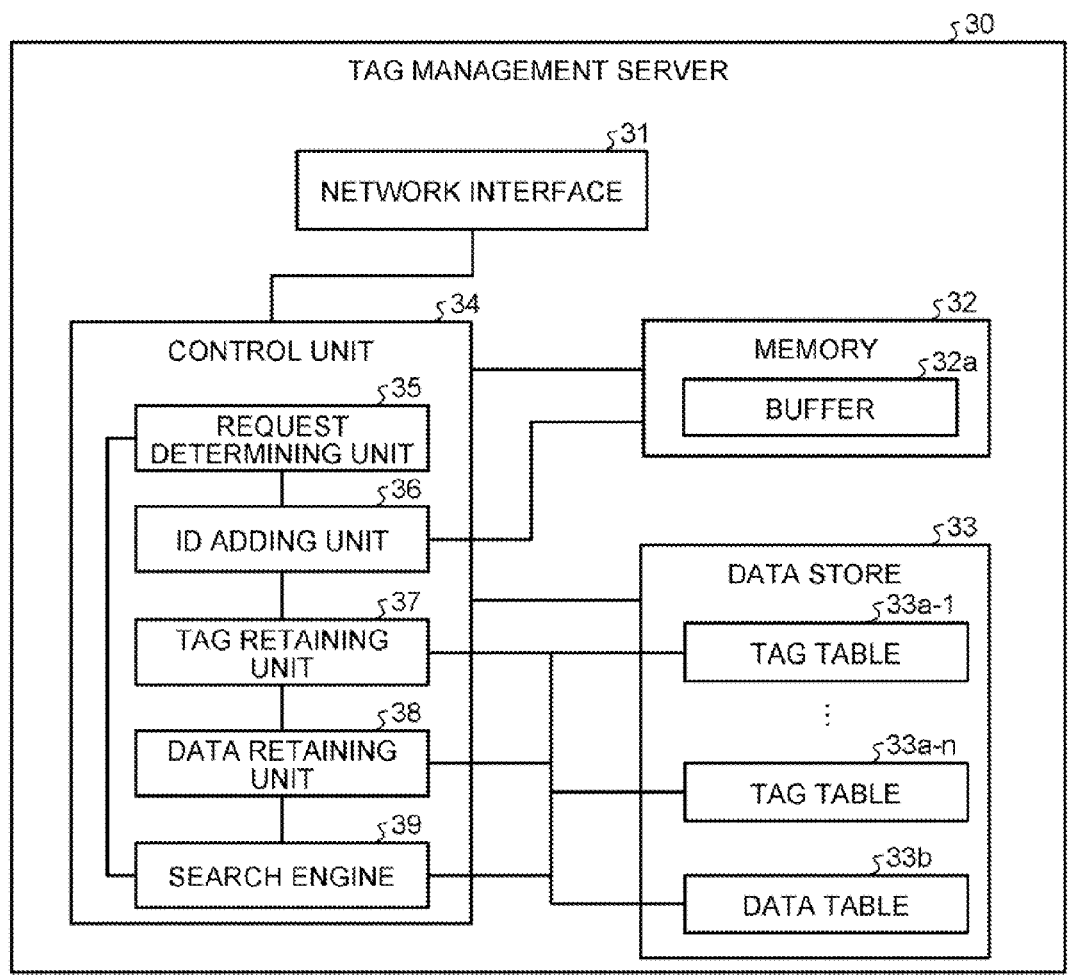
FIG. 4 is a functional block diagram illustrating the configuration of the tag management server according to the second embodiment.

FIG. 4 is a functional block diagram illustrating the configuration of the tag management server according to the second embodiment. As illustrated in FIG. 4, the tag management server 30 includes a network interface 31, a memory 32, a data store 33, and a control unit 34. The control unit included in the tag management server 30 is not limited thereto. For example, an input unit, such as a mouse, a display unit, such as a display, or a storage media reader that reads data from a storage medium may also be included.

The network interface 31 is, for example, a NIC that controls communication with another device. The network interface 31 receives a message from each client terminal and transmits a response indicating an accumulation result of data included in the message. Furthermore, the network interface 31 receives a search request from each client terminal and transmits a response to the search request.

The memory 32 is a storage device that stores therein programs or data executed by the control unit 34 and includes a buffer 32a. The buffer 32a is a storage area that temporarily stores therein data received from a client terminal before storing the data in the data store 33.

The data store 33 is a data store that retains data in a write-once mode, such as CSV format. The data store 33 includes tag tables 33a-1 to 33a-n (n is a natural number) and a data table 33b. The data store 33 is arranged in a storage device, such as a hard disk.

Each of the tag tables 33a-1 to 33a-n is a table arranged for each tag and are dynamically created. FIG. 5 is a schematic diagram illustrating an example of a tag table. As illustrated in FIG. 5, a single tag table has a "Key" and a "Value". Specifically, the tag tables are managed by the same method as a Key-Value Store (KVS).

The "Key" is an ID created by the control unit 34, whereas the "Value" is dummy data from which the KVS is constituted. Instead of using the KVS, the tag table may also be managed by using, for example, a tabular format, such as a relational database (RDB).

In the example illustrated in FIG. 5, "day-of-week and time: Tuesday 12:00-13:00", "day-of-week and time: Monday 9:00-10:00", "location: A Prefecture, E City, F Ward", "location: A Prefecture, B City, C Town", and "road: congestion" are present as tags. Each tag table is associated with a tag.

For example, the tag table 33a-1 is a tag table containing "day-of-week and time: Tuesday 12:00-13:00" and the tag table 33a-2 is a tag table containing "day-of-week and time: Monday 9:00-10:00". Furthermore, the tag table 33a-3 is a tag table containing "location: A Prefecture, E City, F Ward", the tag table 33a-4 is a tag table containing "location: A Prefecture, B City, C Town", and the tag table 33a-5 is a tag table containing "road: congestion".

A description will be given using the tag table containing "day-of-week and time: Tuesday 12:00-13:00". In this tag table, "00003879, True" and "00037192, True" are stored as "Key, Value" in an associated manner. The order in which data is stored in this table is the order the data is received, i.e., IDs are added. Specifically, if a new ID "01234567" is stored, the new ID is stored after "00037192, True", i.e., stored in the end of the tag table. The IDs and the format of the tag indicated here are only an example and are not limited thereto.

The data table 33b is a table that stores therein, in an associated manner, data received from a client terminal and an ID added by an ID adding unit 36. FIG. 6 is a schematic diagram illustrating an example of information stored in a data table. As illustrated in FIG. 6, the data table 33b is constituted by a "Key" and a "Value". Specifically, the data table 33b is managed using the same format as the tag tables.

The "Key" illustrated in FIG. 6 is an ID added by the ID adding unit 36, whereas the "Value" is data included in a message received from a client terminal. In FIG. 6, data of "event A" is associated with "Key=00000001" and data of "event B" is associated with "Key=00003879". The order stored in this table is the order in which data are received, i.e., IDs are added. The IDs and the format of the tag indicated here are only an example and are not limited thereto.

The control unit 34 is a processing unit that performs the overall control of the tag management server 30 by executing an OS and is an electronic circuit, such as a CPU. The control unit 34 includes a request determining unit 35, the ID adding unit 36, a tag retaining unit 37, a data retaining unit 38, and a search engine 39 and the control unit 34 performs, using these units, tag accumulation or tag search.

The request determining unit 35 is a processing unit that determines the type of information received from the client terminal 20. For example, if the request determining unit 35 receives a data accumulation request message from the client terminal 20, the request determining unit 35 outputs the received data accumulation request message to the ID adding unit 36. Furthermore, if the request determining unit 35 receives a search request from the client terminal 20, the request determining unit 35 outputs the received search request to the search engine 39.

Furthermore, if event information and a tag are present in the received message, it may also be possible for the request determining unit 35 to determine that this message is an accumulation request and output data to the ID adding unit 36. In contrast, if only a tag is present in the received message, it may also be possible for the request determining unit 35 to determine that this state is a search request and output data to the search engine 39.

The ID adding unit 36 is a processing unit that adds, to the received messages, IDs that are sequence numbers in the order they are received. The ID adding unit 36 outputs a message to which an ID is added to both the tag retaining unit 37 and the data retaining unit 38. For example, the ID adding unit 36 creates "time and serial number" as an "ID". The "time" is the time at which a message is received and can be received from, for example, a header of a packet. The "ID" is a counter value monotonically increasing in the order it is received. Furthermore, the ID adding unit 36 resets the serial number if the time advances.

With a commonly used OS, the time can be acquired to the accuracy of a millisecond; therefore, a commonly used OS can be used. For example, the ID adding unit 36 allocates, to "13130091120005" as an ID, a fifth message received at UNIX (registered trademark) time 1313009112 (at 20:45:12 on Aug. 10, 2011). Then, if the time advances to 20:46 on Aug. 10, 2011, the ID adding unit 36 resets the serial number to zero and creates the subsequent IDs.

The tag retaining unit 37 adds an ID added by the ID adding unit 36 to a tag table that is associated with the tag that is added to the received message. Then, the tag retaining unit 37 notifies the control unit 34 or the data retaining unit 38 that the ID has been stored in the tag table. In the following, a description will be given of a case in which the tag retaining unit 37 receives, from the ID adding unit 36, a message "tag=day-ofweek and time: Tuesday 12:00-13:00, location: A Prefecture, E City, F Ward, road: congestion, data=event B" to which "ID=00003879" is added.

In this case, the tag retaining unit 37 extracts, as a tag from the received message, "day-of-week and time: Tuesday 12:00-13:00" and "location: A Prefecture, E City, F Ward" and "road: congestion". Similarly, the tag retaining unit 37 extracts "ID=00003879" that is added to a message. Then, the tag retaining unit 37 determines whether a tag table associated with the tag "day-of-week and time: Tuesday 12:00-13:00" is present in the data store 33. If the tag table is present, the tag retaining unit 37 specifies the last record in the subject tag table and writes, in a write-once mode, "Key=00003879 and Value=True" as a record subsequent to the specified record. If the tag table is not present, the tag retaining unit 37 creates, in the data store 33, a new tag table associated with the tag "day-of-week and time: Tuesday 12:00-13:00" and stores "Key=00003879 and Value=True" at the top of the created tag table.

Similarly, the tag retaining unit 37 determines whether a tag table associated with the tag "location: A Prefecture, E City, F Ward" is present in the data store 33. If the tag table is present, the tag retaining unit 37 specifies the last record in the subject tag table and writes, in a write-once mode, "Key=00003879, Value=True" as a record subsequent to the specified record. If the tag table is not present, the tag retaining unit 37 creates a new tag table associated with the tag "location: A Prefecture, E City, F Ward" in the data store 33 and stores "Key=00003879, Value=True" at the top of the created tag table.

Similarly, the tag retaining unit 37 determines whether a tag table associated with the tag "road: congestion" is present in the data store 33. If the tag table is present, the tag retaining unit 37 specifies the last record in the subject tag table and writes, in a write-once mode, "Key=00003879, Value=True" as a record subsequent to the specified record. If the tag table is not present, the tag retaining unit 37 creates a new tag table associated with the tag "road: congestion" in the data store 33 and stores "Key=00003879 and Value=True" at the top of the created tag table.

In other words, the tag retaining unit 37 writes, in a write-once mode, a new record at the end of each tag table. Accordingly, records in each tag table are aligned in the ascending order of the "Key" from the top to the end.

A description will be given here by referring back to FIG. 4. The data retaining unit 38 associates the received message with an ID added by the ID adding unit 36 and adds the received message to the data table 33b. Then, the data retaining unit 38 notifies the control unit 34 or the tag retaining unit 37 that data has been stored in the data table 33b. If the processes performed by both the tag retaining unit 37 and the data retaining unit 38 have been completed, the control unit 34 transmits a response indicating the accumulation of the data to the client terminal 20 that is the transmission source that transmits the message.

In the following, a description will be given by using the same example used in the above description. The data retaining unit 38 receives, from the ID adding unit 36, the message "tag=day-of-week and time: Tuesday 12:00-13:00, location: A Prefecture, E City, F Ward, road: congestion, data=event B" to which "ID=00003879" is added. Subsequently, the data retaining unit 38 extracts "data=event B" and "ID=00003879" from the received information. Then, the data retaining unit 38 specifies the last record by referring to the data table 33b and writes, in a write-once mode, "Key=00003879, Value=event B" as a record subsequent to the specified last record. Specifically, because a new record is added at the end in the data table 33b, the records in the data table 33b are aligned in the ascending order of "Key" from the top to the end.

Figure 7:
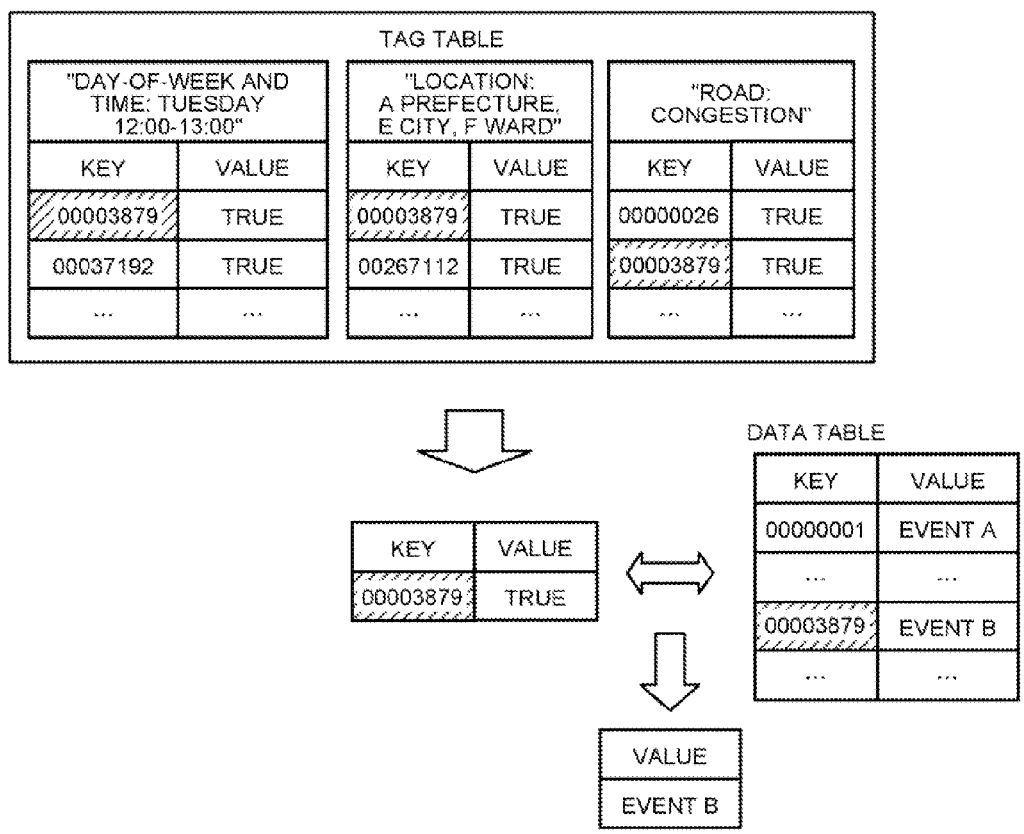
FIG. 7 is a schematic diagram illustrating a search process.

The search engine 39 is a processing unit that searches for data associated with the tag to be searched for by checking the tag tables 33a-1 to 33a-n, which are associated with tags to be searched for, against the data table 33b. For example, it is assumed that the search engine 39 receives a search request to search for data associated with "tag=day-of-week and time: Tuesday 12:00-13:00; location: A Prefecture, E City, F Ward; and road: congestion". FIG. 7 is a schematic diagram illustrating a search process.

In such a case, as illustrated in FIG. 7, the search engine 39 performs a sort merge join process by using a tag table associated with "day-of-week and time: Tuesday 12:00-13:00", a tag table associated with "location: A Prefecture, E City, F Ward", and a tag table associated with "road: congestion". At this time, because the data are sorted in each tag table, the search engine 39 performs only a merge process. Specifically, the search engine 39 extracts, using the sort merge join process, "00003879" as the "Key" present in common in the three tag tables described above. Subsequently, the search engine 39 refers to the data table 33b and specifies the "event B" as the "Value" that is associated with the "Key" of the extracted "00003879". Then, the search engine 39 responds to a client terminal by sending the specified "event B" as a search result.

If the condition of the tag that is received as the search request is an AND condition, the search engine 39 performs on each tag table an inner join as part of the sort merge join process. For example, if the search engine 39 searches for data both in the tag A and the tag B, by performing the inner join, the search engine 39 can extract the "Key" that is stored in common in each tag table. In such a case, the search engine may also search the data table 33b, in addition to the subject tag tables, for data by performing the inner join as part of the sort merge join process.

Furthermore, if the condition of the tag that is received as the search request is an OR condition, the search engine 39 performs on each tag table an outer join as part of the sort merge join process. For example, if the search engine 39 searches for data in the tag A or the tag B, by performing the outer join, the search engine 39 can extract the "Key" that is stored in either one of the tag tables. In such a case, by using both the result obtained in the sort merge join process performed on each subject tag table and the data table 33b, the search engine 39 searches for data by performing the inner join as part of the sort merge join process.

[Flow of a Process]

In the following, the flow of a process performed by the tag management server 30 will be described. The processes performed by the client terminals are common processes, such as a data creating process and a tagging process; therefore, a description thereof in detail will be omitted.

(Flow of a Accumulation Process)

Figure 8:
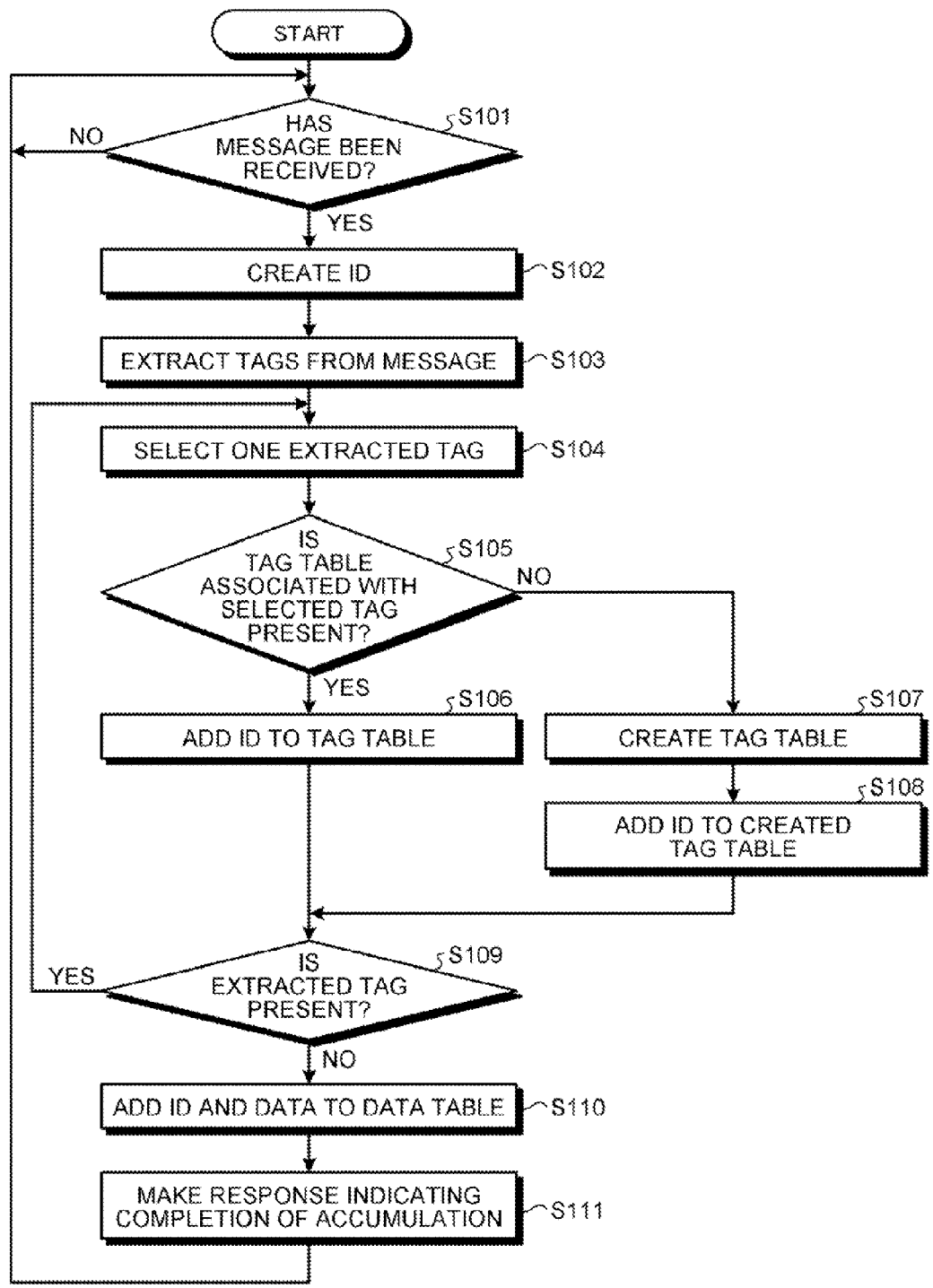
FIG. 8 is a flowchart illustrating the flow of an accumulation process performed by the tag management server according to the second embodiment.

FIG. 8 is a flowchart illustrating the flow of an accumulation process performed by the tag management server according to the second embodiment. As illustrated in FIG. 8, if the request determining unit 35 in the tag management server 30 determines that a message is received (Yes at Step S101), the ID adding unit 36 creates an ID in the received message by using, for example, the time of receipt and adds the created ID (Step S102).

Subsequently, the tag retaining unit 37 extracts, from the received message, a tag contained in the subject message (Step S103). Then, the tag retaining unit 37 selects a single extracted tag (Step S104) and determines whether the tag table associated with the selected tag is present in the data store 33 (Step S105).

If the tag table associated with the selected tag is present (Yes at Step S105), the tag retaining unit 37 writes, at the end of the subject tag table in a write-once mode, a record indicating "Key=ID created by the ID adding unit 36 and Value=True" (Step S106).

In contrast, if a tag table associated with the selected tag is not present (No at Step S105), the tag retaining unit 37 creates a new tag table associated with the selected tag in the data store 33 (Step S107). Then, the tag retaining unit 37 writes, at the top of the created tag table in a write-once mode, a record indicating "Key=ID created by the ID adding unit 36 and Value=True" (Step S108).

Then, if the tag retaining unit 37 determines that the extracted tag is also present in another tag table (Yes at Step S109), the tag retaining unit 37 repeats the processes by returning to Step S104.

In contrast, if the tag retaining unit 37 determines that the tag is not present (No at Step S109), the tag retaining unit 37 extracts data from the received message and performs the process at Step S110. Specifically, the data retaining unit 38 writes, at the end of the data table 33b in a write-once mode, the record indicating "Key=ID created by the ID adding unit 36 and Value=extracted data" (Step S110).

Then, the control unit 34 responds to the client terminal 20, which is the message transmission source, by sending the accumulation completion indicating that the received message is accumulated in the data store 33 (Step S111). In the flow described above, the process performed at Step S110 is performed after the process performed at Steps S103 to S109; however, the order of the processes is not limited thereto. For example, the process performed at Step S110 may also be performed first or performed in parallel.

Flow Of a Search Process

Figure 9:
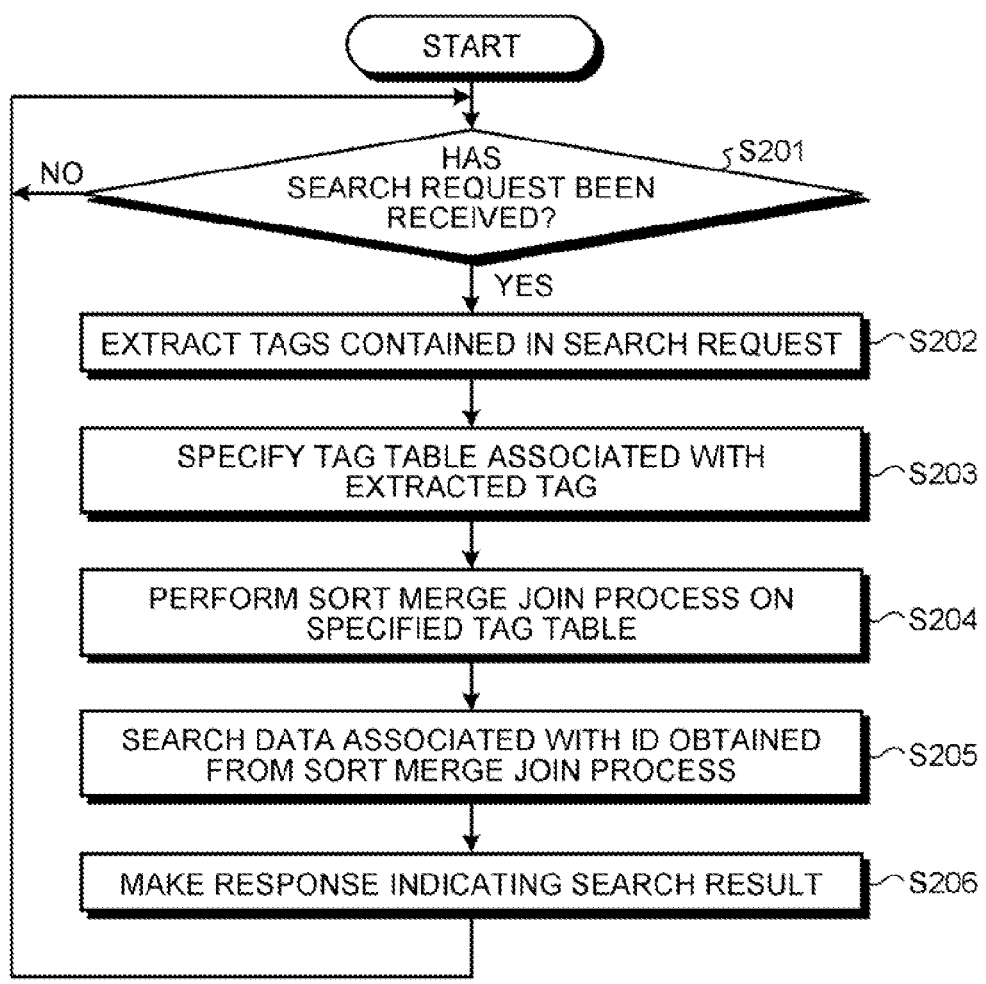
FIG. 9 is a flowchart illustrating the flow of a search process performed by the tag management server according to the second embodiment.

FIG. 9 is a flowchart illustrating the flow of a search process performed by the tag management server according to the second embodiment. As illustrated in FIG. 9, if the request determining unit 35 in the tag management server 30 determines that the request determining unit 35 receives a search request (Yes at Step S201), the search engine 39 extracts tags contained in the search request (Step S202).

Subsequently, the search engine 39 specifies, from the data store 33, tag tables associated with the extracted tags (Step S203) and performs the sort merge join process on the specified tag tables (Step S204). For example, the search engine 39 specifies an "ID (Key)" stored in common in the extracted tag tables.

Then, the search engine 39 searches the data table 33b for "data (Value)" associated with an "ID" that is acquired from the sort merge join process (Step S205). Thereafter, the search engine 39 responds to the client terminal 20, which is the source of the search request, by sending the searched "data" as a search result (Step S206).

In this way, the tag management server 30 can store, in the KVS format, therein tags and data by using different tag tables 33a. Furthermore, the tag management server 30 can add a record to each table in the state in which IDs are aligned in the ascending order. Accordingly, even if data is stored in a hard disk due to large amount of data, the tag management server 30 can suppresses the occurrence of random access, thus improving the search performance. Furthermore, even if data is searched by performing the sort merge join process, it is possible to perform a join process without performing a sort process, thus speeding up the process.

[c] Third Embodiment

In the second embodiment, a description has been given of a case in which a single tag management server is used; however, the configuration is not limited thereto. For example, multiple tag management servers may also be used. Accordingly, in a third embodiment, a description will be given of a case in which multiple tag management servers are used. Furthermore, in the third embodiment, there will be descriptions of the overall configuration of a system that has multiple tag management servers, the configuration of the tag management server, and the flow of a process. Because the client terminals have the same configuration as that in the first and second embodiments, a description thereof in detail will be omitted.

[Overall Configuration of a System]

Figure 10:
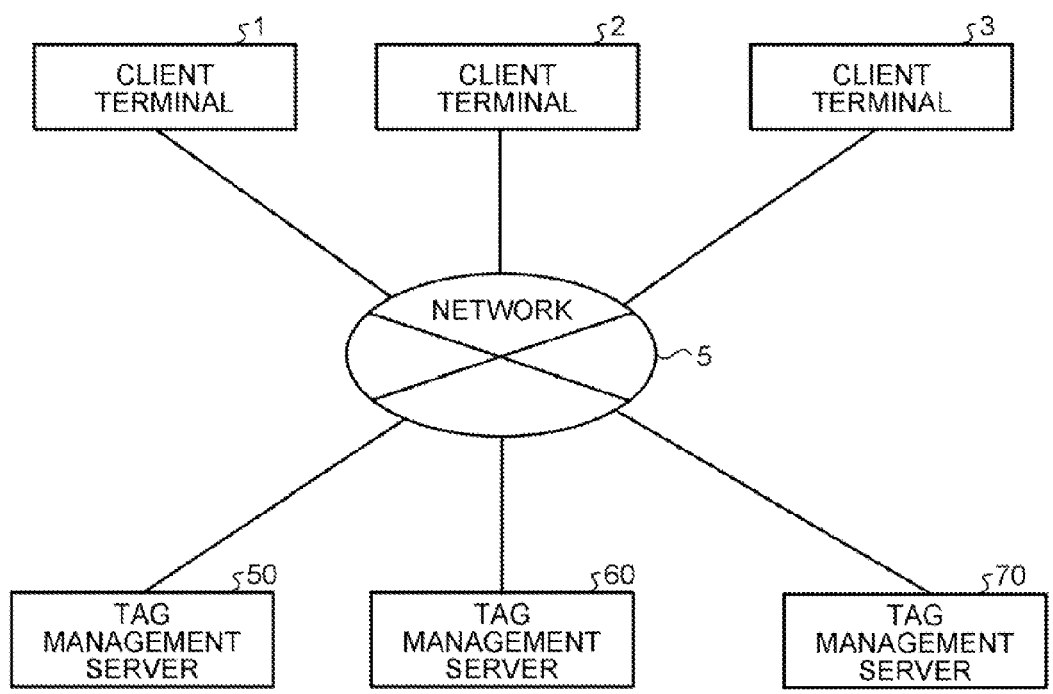
FIG. 10 is a schematic diagram illustrating an example of the overall configuration of a system according to a third embodiment.

FIG. 10 is a schematic diagram illustrating an example of the overall configuration of a system according to a third embodiment. In the system illustrated in FIG. 10, the client terminal 1, the client terminal 2, the client terminal 3, a tag management server 50, a tag management server 60, and a tag management server 70 are connected via a network such that they can communicate with each other.

In this system, each of the client terminals 1 to 3 transmits tagged data to any one of the tag management servers. Then, the tag management server that receives the data assigns a tag management server that accumulates the data and the assigned tag management server then accumulates the data. The tag management server accessed by the client terminals 1 to 3 for the first time may be any tag management server constituting the system or may be a different tag management server for each access.

Furthermore, each of the client terminals 1 to 3 transmits a search request to any one of the tag management servers. Then, the tag management server that receives the search request transfers the search request to itself and all of the other tag management servers. Then, the tag management server that transferred the search request receives a search result from each of the tag management servers, aggregates the search results, and responds to the client terminals 1 to 3 by sending the aggregated result as a search result.

The number of devices or the like is only for an example and is not limited thereto. In the third embodiment, a tag management server that receives data or a search request from a client terminal for the first time may sometimes be referred to as a "receptor".

[Configuration of the Tag Management Server]

Figure 11:
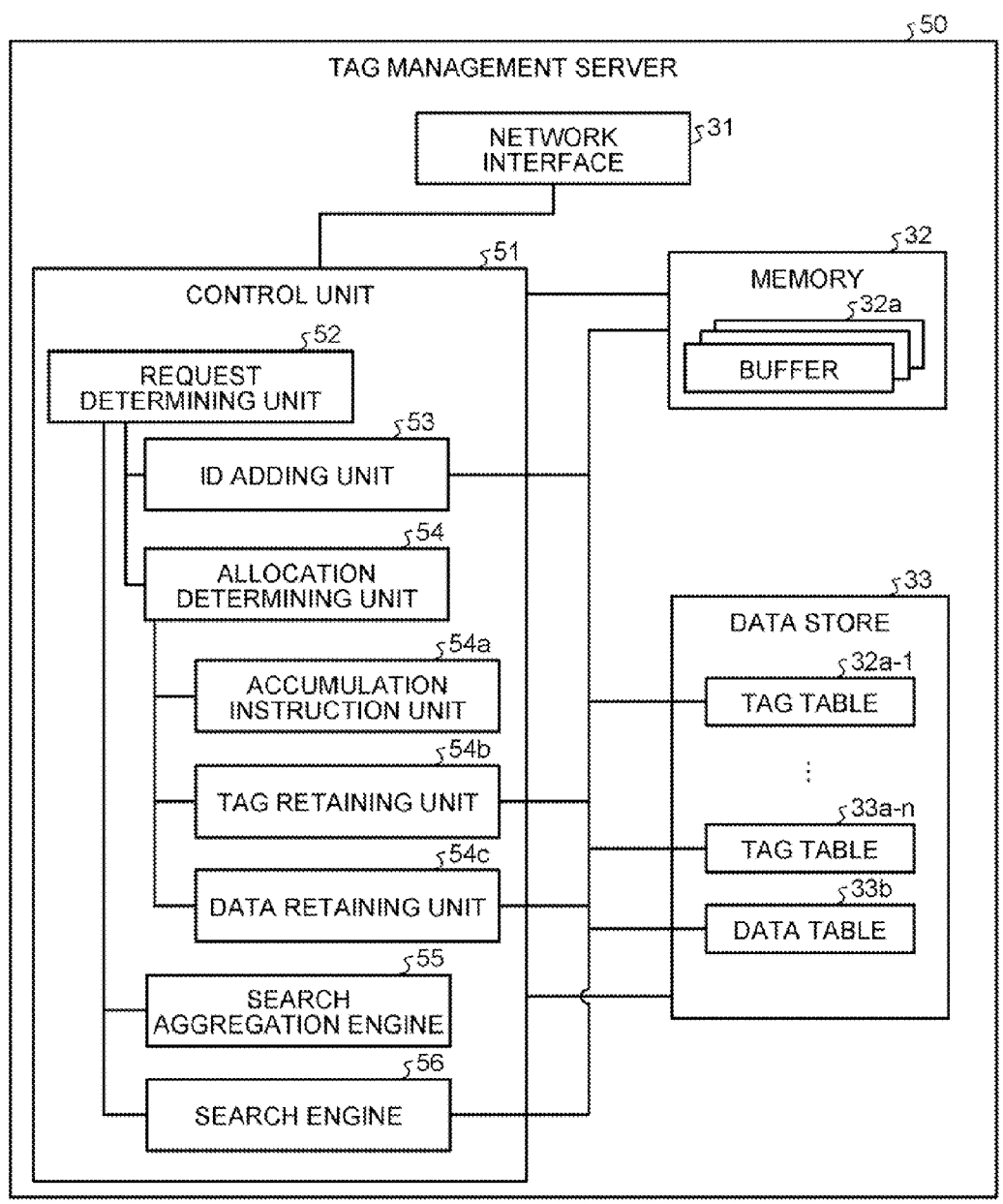
FIG. 11 is a functional block diagram illustrating the configuration of a tag management server according to the third embodiment.

In the following, the configuration of the tag management servers illustrated in FIG. 10 will be described. Because the tag management server 50, the tag management server 60, and the tag management server 70 illustrated in FIG. 10 have the same configuration, in the third embodiment, only the tag management server 50 will be described. FIG. 11 is a functional block diagram illustrating the configuration of a tag management server according to the third embodiment. Furthermore, in the third embodiment, it is assumed that the client terminal 1 transmits a data accumulation request message or a search request to the tag management server 50.

As illustrated in FIG. 11, the tag management server 50 includes the network interface 31, the memory 32, the data store 33, and a control unit 51. The control unit included in the tag management server 50 is not limited thereto. For example, an input unit, such as a mouse, a display unit, such as a display, or a storage media reader that reads data from a storage medium may also be included. Furthermore, the network interface 31, the memory 32, and the data store 33 has the same configuration as that in the second embodiment; therefore, a description thereof in detail will be omitted.

The control unit 51 is a processing unit that performs the overall control of the tag management server 50 by executing an OS and is an electronic circuit, such as a CPU. The control unit 51 includes a request determining unit 52, an ID adding unit 53, an allocation determining unit 54, an accumulation instruction unit 54a, a tag retaining unit 54b, a data retaining unit 54c, a search aggregation engine 55, and a search engine 56 and the control unit 51 performs, using these units, tag accumulation or tag search.

The request determining unit 52 is a processing unit that performs the same process performed by the request determining unit 35 described in the second embodiment and that determines the type of information received from the client terminal 1. For example, if the request determining unit 52 receives a message from the client terminal 1, the request determining unit 52 outputs the received message to the ID adding unit. Furthermore, if the request determining unit 52 receives a search request from the client terminal 1, the request determining unit 52 outputs the received search request to the search engine 56.

Furthermore, if the request determining unit 52 receives a message and an ID from a receptor, the request determining unit 52 outputs the received message and the ID to both the tag retaining unit 54b and the data retaining unit 54c If the request determining unit 52 receives a search request from a receptor, the request determining unit 52 outputs the search request to the search engine 56.

The ID adding unit 53 is a processing unit that performs the same process performed by the ID adding unit 36 described in the second embodiment and that adds, to the received messages, IDs that are sequence numbers in the order they are received. The ID adding unit 53 outputs a message to which an ID is added to the accumulation instruction unit 54a. For example, the ID adding unit 53 creates "time, server name, and serial number" as an "ID".

For example, the ID adding unit 53 in a tag management server whose server name is Z allocates, to "1313009112Z0005" as an ID, a fifth message received at UNIX (registered trademark) time 1313009112 (at 20:45:12 on Aug. 10, 2011). Then, if the time advances to 20:46 on Aug. 10, 2012, the ID adding unit 53 resets the serial number to zero and creates the subsequent IDs.

The allocation determining unit 54 is a processing unit that determines, using sharding, a tag management server corresponding to the storage destination of the message transmitted from the client terminal. Specifically, the allocation determining unit 54 performs the determination using, for example, an algorithm, such as Chord, or a distributed hash table (DHT).

For example, each tag management server stores, in a hard disk or the like, hash values or the range of hash values managed by each of the corresponding tag management server and stores, in a hard disk, hash values managed by another server or the range of hash values managed by another server. In such a state, the allocation determining unit 54 calculates a hash value of an ID that is added by the ID adding unit 53. Then, the allocation determining unit 54 specifies a tag management server that manages the calculated hash value and determines that the specified tag management server is the server that manages the accumulation process. Then, the allocation determining unit 54 notifies the accumulation instruction unit 54a of the received message, the ID, and information on the determined tag management server. The hash function or the like that is used by the allocation determining unit 54 is the hash function typically used in the DHT.

The accumulation instruction unit 54a is a processing unit that transmits, to the tag management server assigned by the allocation determining unit 54, a message transmitted by a client terminal or an ID added by the ID adding unit 53. For example, if the accumulation instruction unit 54a receives, from the allocation determining unit 54, for example, a host name or the Internet Protocol (IP) address of the tag management server 70, the accumulation instruction unit 54a transmits, to the tag management server 70, the message and the ID received from the allocation determining unit 54. Furthermore, if the accumulation instruction unit 54a receives a notification from the allocation determining unit 54 indicating that a subject tag management server manages accumulation, the accumulation instruction unit 54a transmits, to both the tag retaining unit 54b and the data retaining unit 54c, the message and the ID received from the allocation determining unit 54.

If the tag retaining unit 54b receives the message and the ID from the request determining unit 52 or the accumulation instruction unit 54a, the tag retaining unit 54b performs tag accumulation. Specifically, if the subject tag management server that includes the tag retaining unit 54b is determined to be the management server for the accumulation by a receptor or the allocation determining unit 54, the tag retaining unit 54b in the subject tag management server performs tag accumulation. The specific processes are the same as those performed in the second embodiment; therefore, a description thereof in detail will be omitted.

If the data retaining unit 54c receives, from the request determining unit 52 or the accumulation instruction unit 54a, the message and the ID, the data retaining unit 54c performs data accumulation. Specifically, if the subject tag management server that includes the data retaining unit 54c is determined to be the management server for the accumulation by the receptor or the allocation determining unit 54, the data retaining unit 54c in the subject tag management server performs data accumulation. The specific processes are the same as those performed in the second embodiment; therefore, a description thereof in detail will be omitted.

The search aggregation engine 55 is a processing unit that transfers a search request transmitted from the client terminal 1 to another tag management server, aggregates search results received from the tag management servers, and responds to the client terminal 1. For example, if the request determining unit 52 receives a search request from the client terminal 1, the search aggregation engine 55 transmits the search request to the search engine 56 in another tag management server or to the search engine 56 in the subject tag management server. Then, the search aggregation engine 55 receives the search results from tag management servers that are the destinations of the search request. Then, the search aggregation engine 55 merges the received search results and responds to the client terminal 1, which is the transmission source of the search request.

The search engine 56 is a processing unit that performs the same search process as that performed in the second embodiment if a search request is transmitted from the request determining unit 52 or the search aggregation engine 55. For example, if a search request is transmitted from the request determining unit 52, i.e., if the search engine 56 receives a search request transmitted from a receptor, the search engine 56 performs the search process and responds to the receptor by sending the result thereof. Furthermore, if the search engine 56 receives a search request from the search aggregation engine 55, the search engine 56 performs the search process and responds to the search aggregation engine 55 by sending the result thereof.

Flow Of a Process

In the following, the flow of a process performed by the tag management server will be described. Because the tag management servers 50 to 70 perform the same process, a description will be given using the tag management server 50 as an example. Specifically, a description will be given of a case in which the tag management server 50 performs a process functioning as a receptor or another tag management server. Furthermore, the processes performed by the client terminals are common processes, such as a data creating process and a tagging process; therefore, descriptions thereof in detail will be omitted.

Flow Of an Accumulation Process

Figure 12:
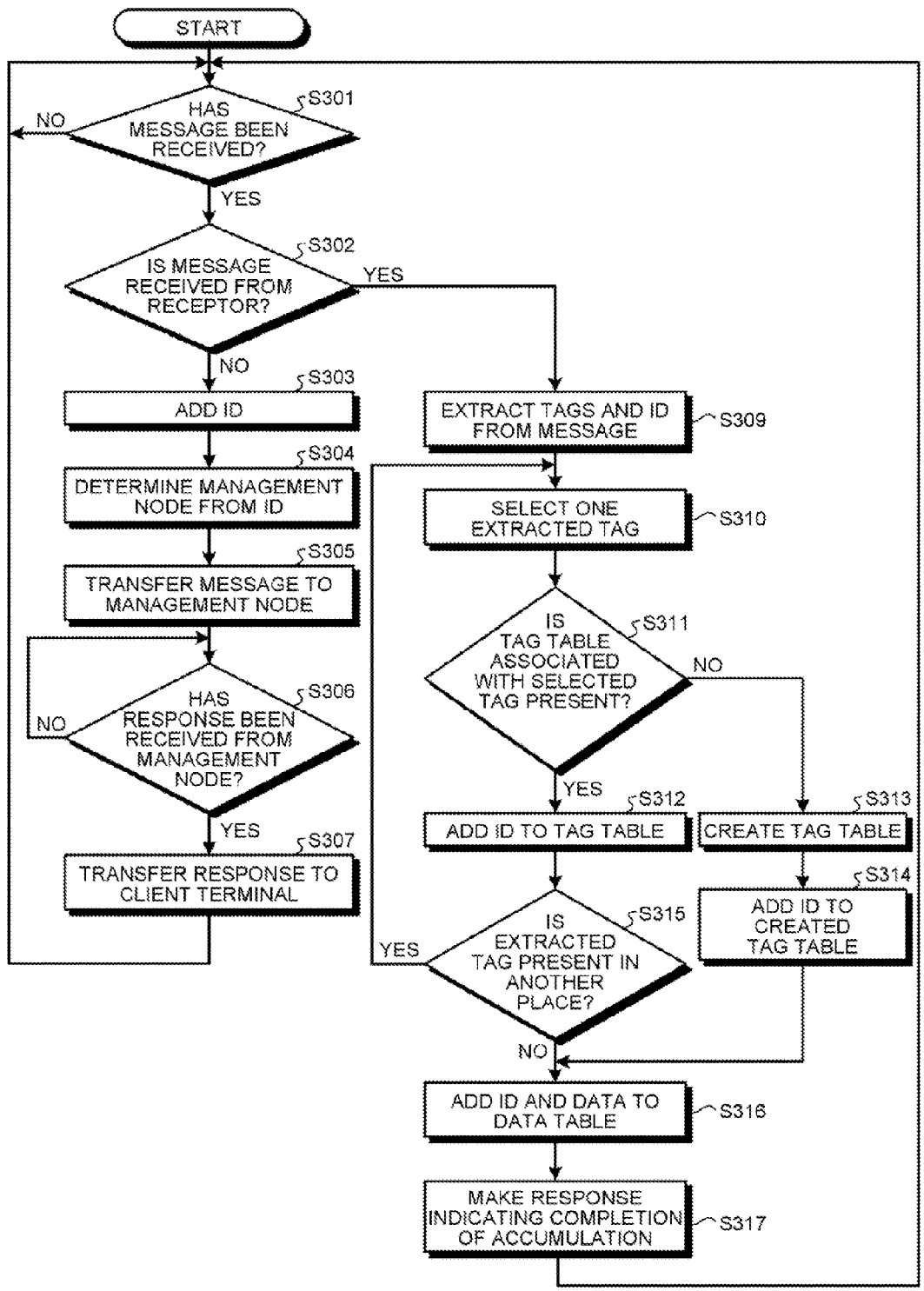
FIG. 12 is a flowchart illustrating the flow of an accumulation process performed by the tag management server according to the third embodiment.

FIG. 12 is a flowchart illustrating the flow of an accumulation process performed by the tag management server according to the third embodiment. As illustrated in FIG. 12, if the request determining unit 52 in the tag management server 50 receives a message (Yes at Step S301), the request determining unit 52 determines whether the message is received from a receptor (Step S302). If an ID is added to the message, the request determining unit 52 can determine that the message is received from the receptor.

Then, if the request determining unit 52 determines that the message is received not from the receptor but from the ID adding unit 53 (No at Step S302), the client terminal 1 adds an ID to the received message (Step S303). Subsequently, the allocation determining unit 54 calculates the hash value of the ID added by the ID adding unit 53 and assigns a management node that accumulates messages in accordance with the calculated hash value (Step S304).

Then, the accumulation instruction unit 54a transmits, to the management node determined by the allocation determining unit 54, both the message received from the client terminal 1 and the ID added by the ID adding unit 53 (Step S305). If the subject tag management server that includes the accumulation instruction unit 54a is determined to be the management node by the allocation determining unit 54, the accumulation instruction unit 54a in the subject tag management server outputs the message and the ID to both the tag retaining unit 54b and the data retaining unit 54c. Similarly to the second embodiment, in such a case, both the tag retaining unit 54b and the data retaining unit 54c store a tag and data.

If the accumulation instruction unit 54a receives, from the management node that transmits the message and the ID, a response indicating that the accumulation process has been completed (Yes at Step S306), the accumulation instruction unit 54a transmits the response to the client terminal corresponding to the transmission source of the message (Step S307). If the accumulation instruction unit 54a outputs the message and the ID to both the tag retaining unit 54b and the data retaining unit 54c, the accumulation instruction unit 54a receives the response from the tag retaining unit 54b and the data retaining unit 54c.

In contrast, if the request determining unit 52 determines that the message is received not from the client terminal 1 but from the receptor (Yes at Step S302), the tag retaining unit 54b or the data retaining unit 54c performs the processes at Steps S309 to S317. The processes performed at Steps S309 to S317 are the same as those performed at Steps S103 to S111 described in the second embodiment; therefore, a description thereof in detail will be omitted. The third embodiment differs from the second embodiment in that the destination to which a response indicating that the accumulation has been completed is sent is a receptor not a client terminal.

(Flow of a Search Process)

Figure 13:
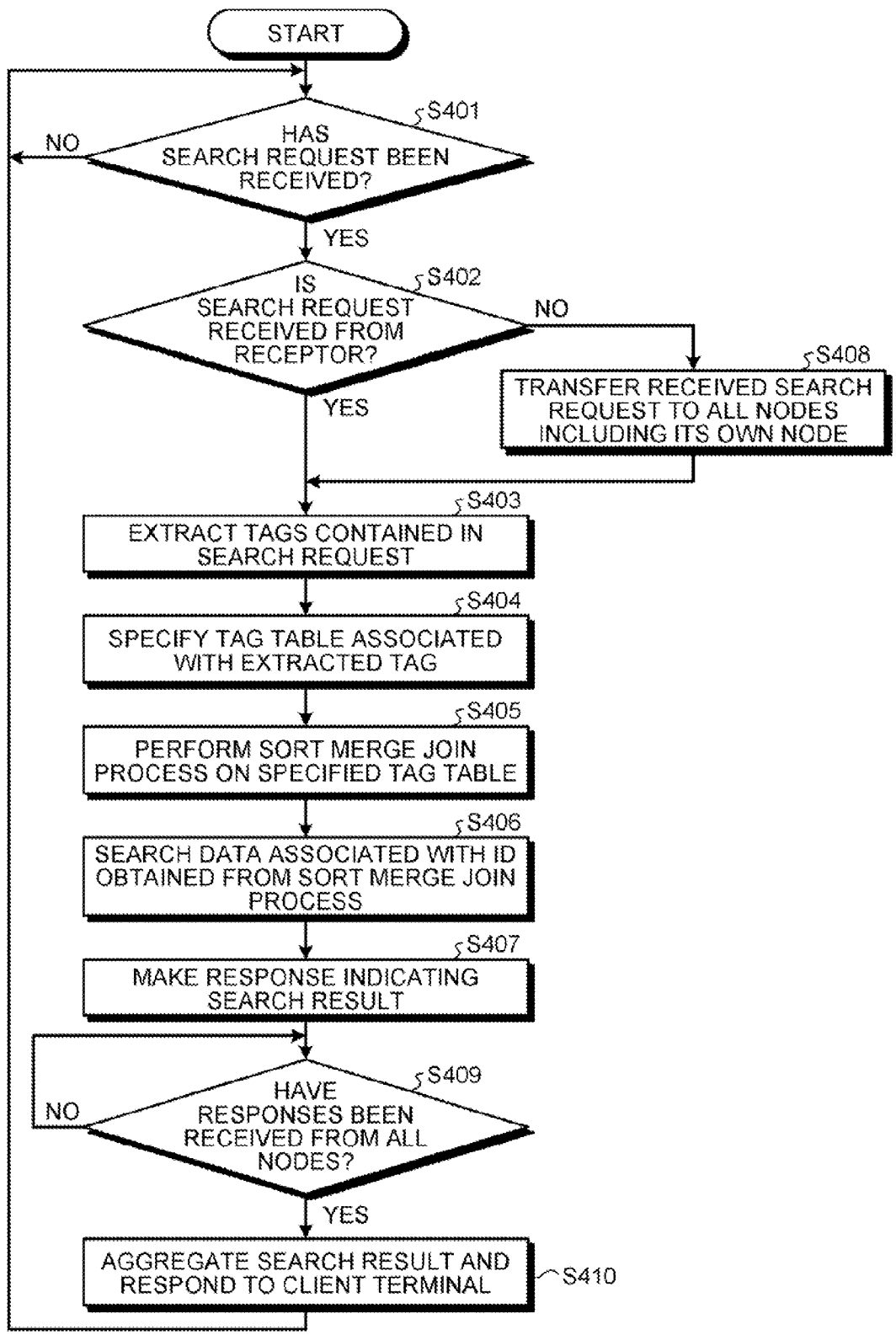
FIG. 13 is a flowchart illustrating the flow of a search process performed by the tag management server according to the third embodiment.

FIG. 13 is a flowchart illustrating the flow of a search process performed by the tag management server according to the third embodiment. As illustrated in FIG. 13, if the request determining unit 52 in the tag management server 50 receives a search request (Yes at Step S401), the request determining unit 52 determines whether the search request is received from a receptor (Step S402).

If the request determining unit 52 determines that a search request is received not from the client terminal 1 but from a receptor (Yes at Step S402), the search engine 56 performs the processes at Steps S403 to S407. The processes performed at Steps S403 to S407 are the same as those performed at Steps S202 to S206 described in the second embodiment; therefore, a description thereof in detail will be omitted. The third embodiment differs from the second embodiment in that in the second embodiment the destination to which a response of the search result is sent is a receptor not the client terminal 1.

In contrast, if the request determining unit 52 determines that a search request is received not from a receptor from a client terminal (No at Step S402), the search aggregation engine 55 transfers the received search request to all nodes including its own node (Step S408). Specifically, the search aggregation engine 55 outputs the search request to all of the nodes in addition to the search engine 56 included in the subject tag management server.

Then, the search engine 56 performs the same processes performed at Steps S403 to S407 described above, searches for data associated with the tag included in the search request, and outputs the search result to the search aggregation engine 55.

Thereafter, if the search aggregation engine 55 receives search results from all the nodes, which are transfer destinations of the search request, and from the search engine 56 that is included in the subject tag management server (Yes at Step S409), the search aggregation engine 55 aggregates the search results and responds to the client terminals (Step S410).

In this way, each of the multiple servers connected by a network allows data to be written. Each of the servers that allows the data to be written adds IDs that are increased monotonically. The IDs are created such that they are not duplicated and such that they are increased monotonically as much as possible over the entire system. A server that manages data is determined by performing sharding on the basis of the IDs. Furthermore, in the third embodiment, when data is accumulated, communication occurs when the data is transferred from the server that received the data to the server that manages the data. Furthermore, in the third embodiment, because the data is orderly allocated and arranged due to the sharding, communication occurs only when the search results of the servers are aggregated at the last step, instead of communicating at the time of the search process. In this way, it is possible to reduce the number of times the communication occurs. Accordingly, in addition to expecting the performance improvement by inhibiting random access, communication can be reduced as much as possible by designing the allocation of the IDs and the sharding, thus maintaining the scalability.

[d] Fourth Embodiment

In the above explanation, a description has been given of the embodiments according to the present invention; however, the embodiments are not limited thereto and the present invention can be implemented with various kinds of embodiments other than the embodiments described above. Therefore, another embodiment will be described below.

Random Access

In the embodiments described above, a description has been given of a case in which data is searched by performing the sort merge join process regardless of the number of pieces of data to be stored in the data store; however, the present invention is not limited thereto. For example, if the number of pieces of data to be stored is less than a predetermined value, data may also be searched by performing random access. If the number of pieces of data to be stored is greater than the predetermined value, data may also be searched by using the method described in the above embodiments.

If the number of pieces of data is small, because an area that can be accessed is small even if random access occurs, the search process using random access can be performed faster when compared with a case in which random access is not used. The predetermined value may be determined on the basis of the rotational speed of a disk. The predetermined value may also be set to, for example, 100 pieces of data or one thousandth of the total number of pieces of data by, for example, an administrator.

Retain the Data Main Body

In the embodiments described above, a description has been given of a case in which the tag management server stores, in a tag table, IDs and dummy data in an associated manner; however, the present invention is not limited thereto. For example, if the number of pieces of data to be stored in a tag table is small, such as 100 pieces of data, the tag management server may also store the data in the tag table itself. Alternatively, the tag management server may also store, in the tag table, data, i.e., a subset of data from among the data, that is frequently used. Specifically, the tag management server stores, in each tag table, "ID, data" until the number of pieces of data to be stored reaches the predetermined value. The data to be stored here means, for example, a subset of the data. In such a case, instead of searching a data table, the tag management server can search only a tag table for data associated with a tag to be searched for, thus further speeding up the search process.

Use of a Buffer

For example, there may be a case in which, due to the type of allocation of IDs or the time taken to transfer data, the order in which messages and IDs arrive at a server that manages the data becomes random and therefore IDs do not increase monotonically; however, the random order can be absorbed in a buffer in a memory. Specifically, if the tag management server receives a message and an ID from a client terminal or a receptor, the tag management server temporarily stores the message and the ID in the buffer in the memory. The buffer may also store therein data for each tag table. In such a case, if a new tag table is created, a new buffer region needs to be arranged in the memory.

Then, the tag management server stores the data in the subject tag table after sorting messages in the buffer by using IDs. By doing so, even if messages are consecutively received or messages are not received in the order of the IDs, the IDs or the like can be stored in, for example, a tag table in the state in which the IDs are sorted. Furthermore, on the basis of the type of allocation of IDs and the time taken to transfer the data, it is possible to calculate the time at which data will possibly arrive late. Accordingly, the size of data to be buffered can be determined on the basis of the time and the maximum throughput of the data.

Location of Data to be Stored

In the embodiments described above, a description has been given of a case of creating, by storing a record at the end of a tag table or a data table, a table in which data is sorted in the ascending order of IDs; however, the present invention is not limited thereto. For example, the tag management server may also store a new record at the top in each table. Accordingly, because the tag management server can create a table in which data is sorted in descending order, the tag management server can perform the same search process described in the above embodiments.

Identifier

In the embodiments described above, a description has been given of a case in which monotonically increasing identifiers are added such that the receiving order can be identified; however, the present invention is not limited thereto. For example, it may also be possible to add sort-free identifiers, such as monotonically decreasing numbers or character strings arranged in alphabetical order, such that the receiving order can be identified. Specifically, the tag management server adds an identifier such that, if data is recorded in a tag table or a data table in the order the data is received, information to be stored in each table is sorted by identifiers.

System

Of the processes described in the embodiments, the whole or a part of the processes that are mentioned as being automatically performed can be manually performed, or the whole or a part of the processes that are mentioned as being manually performed can be automatically performed using known methods. Furthermore, the flow of the processes, the control procedures, the specific names, and the information containing various kinds of data or parameters indicated in the above specification and drawings can be arbitrarily changed unless otherwise noted.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. Furthermore, all or any part of the processing functions performed by each device can be implemented by a CPU and by programs analyzed and executed by the CPU or implemented as hardware by wired logic.

Program

The various processes described in the above embodiments can be implemented by programs prepared in advance and executed by a computer such as a personal computer or a workstation. Accordingly, in the following, an example of a computer system that executes a program having the same function performed by the device in the above embodiments will be described.

Figure 14:
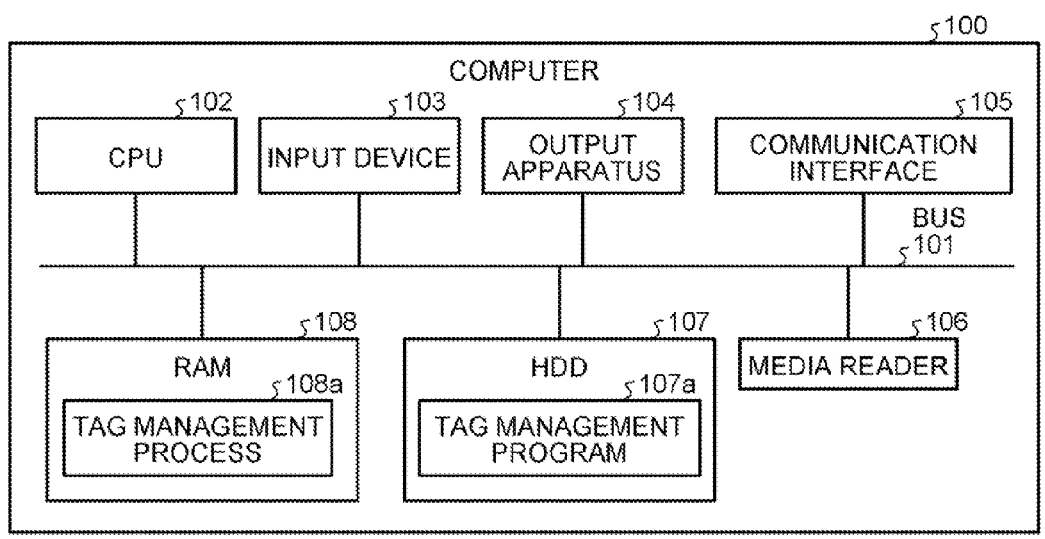
FIG. 14 is a block diagram illustrating an example of the hardware configuration of a computer that executes a tag management program.

FIG. 14 is a block diagram illustrating an example of the hardware configuration of a computer that executes a tag management program. As illustrated in FIG. 14, a computer 100 includes a CPU 102, an input device 103, an output apparatus 104, a communication interface 105, a media reader 106, a hard disk drive (HDD) 107, and a random access memory (RAM) 108. The units illustrated in FIG. 14 are connected by a bus 101 with each other.

The input device 103 is, for example, a mouse or a keyboard; the output apparatus 104 is, for example, a display; and the communication interface 105 is an interface, such as a NIC. The HDD 107 stores therein, together with a tag management program 107a, the tables illustrated in FIG. 5 or 6.

The HDD 107 is mentioned as an example of the recording medium; however, the present invention is not limited thereto. For example, various programs may also be stored in another computer readable recording medium, such as a read only memory (ROM), a RAM, a CD-ROM and may also be read by a computer. Furthermore, a program may also be obtained and used by arranging a storage medium at a remote site and by a computer accessing the storage medium. Furthermore, at this time, the obtained program may also be stored in the recording medium in the computer.

The CPU 102 reads the tag management program 107a and loads it in the RAM 108, thus operating a tag management process 108a that executes functions described above with reference to FIGS. 4, 11, and the like. Specifically, the tag management process 108a executes the same functions as those performed by the request determining unit 35, the ID adding unit 36, the tag retaining unit 37, the data retaining unit 38, and the search engine 39 illustrated in FIG. 4. Furthermore, the tag management process 108a executes the same functions as those performed by the request determining unit 52, the ID adding unit 53, the allocation determining unit 54, the accumulation instruction unit 54a, the tag retaining unit 54b, the data retaining unit 54c, the search aggregation engine 55, and the search engine 56 illustrated in FIG. 11. In this way, by reading and executing the program, the computer 100 operates as an information processing apparatus that executes the tag management method.

Furthermore, the computer 100 reads the tag management program from the recording medium by the media reader 106 and executes the read tag management program, thereby the computer 100 may also implement the same function described in the embodiments. The program mentioned in the embodiment is not limited to the program executed by the computer 100. For example, the present invention may also be used in a case in which another computer or a server executes the program or in which another computer or a server cooperatively executes the program with each other.

According to an aspect of the embodiments, search performance can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A tag management device comprising:
    a data store which stores a plurality of first tables associated with a of plurality of tags and a second table; and
    a processor coupled to the data store, wherein the processor executes a process comprising:
    adding, to a message including data and a plurality of tags received, a sort-free identifier that identifies receiving order, and is monotonically increasing or monotonically decreasing numbers or character strings arranged in alphabetical order or a combination thereof;
    first storing, in receiving order in all first tables associated with each tag that is included in the received message, only the sort-free identifier added at the adding;
    second storing, in receiving order in the second table in an associated manner, the sort-free identifier added at the adding and the data which is included in the received message;
    receiving a search request that includes a search condition being constituted using a plurality of tags;
    executing an inner join that extracts the sort-free identifier that is stored in common in the each first table associated with each tag that is included in the received search request when the search condition is AND condition, and executing an outer join that extracts the sort-free identifier that is stored in either one of the each first table associated with each tag that is included in the received search request when the search condition is OR condition; and
    searching the data associated with the extracted sort-free identifier from the second table.

2. The tag management device according to claim 1, wherein, the first storing includes storing, when the number of the stored sort-free identifiers in the first table is less than a predetermined value, the sort-free identifier and the data which is included in the received message in an associated manner in the first table.

3. The tag management device according to claim 1, wherein,
    the executing includes specifying, when the number of pieces of the stored sort-free identifier is less than the predetermined value, the sort-free identifier associated with the tag to be searched for by performing random access to the first table that is associated with the tag to be searched for, and
    the searching includes searching the second table for data associated with the specified sort-free identifier.

4. A tag management system comprising multiple tag management devices that accumulate data received from a client terminal, wherein
    each of the multiple tag management devices includes,
        a data store which stores a plurality of first tables associated with a of plurality of tags and a second table; and
        a processor coupled to the data store, wherein the processor executes a process comprising:
        adding, to a message received from the client terminal, the message including data and a plurality of tags, a sort-free identifier that identifies receiving order, and are monotonically increasing or monotonically decreasing numbers or character strings arranged in alphabetical order or a combination thereof;
        determining, on the basis of a value calculated by using the sort-free identifier added at the adding, a node that manages accumulation of the data;
        first transferring the message and the sort-free identifier to the node determined at the determining;
        first storing, in receiving order in all first tables associated with each tag that is included in the received message, only the sort-free identifier added at the adding when a subject tag management device is determined to be a node that manages the accumulation of the message at the determining or when a subject tag management device receives the message and the sort-free identifier from another tag management device; and
        second storing, in receiving order in the second table in an associated manner, the sort-free identifier added at the adding and the data which is included in the received message when a subject tag management device is determined to be a node that manages the accumulation of the message at the determining or when a subject tag management device receives the message and the sort-free identifier from another tag management device.

5. The tag management system according to claim 4, wherein the process further comprises:
   second transferring, when a search request that includes a search condition being constituted using a plurality of tags is received from the client terminal, the search request to each of the tag management devices including the subject tag management device;
   executing an inner join that extracts the sort-free identifier that is stored in common in the each first table associated with each tag that is included in the received search request when the search condition is AND condition, and executing an outer join that extracts the sort-free identifier that is stored in either one of the each first table associated with each tag that is included in the received search request when the search condition is OR condition;
   searching the data associated with the extracted sort-free identifier from the second table; and
   responding to the client terminal by aggregating search results obtained at the searching and a search result received from each of the tag management devices.

6. The tag management system according to claim 4, wherein the first storing includes sorting, before adding the sort-free identifier to the each first table, a plurality of combinations of messages and sort-free identifiers received from the other tag management device in a buffer reserved in a memory, and storing the sort-free identifier included in the combinations in the each first table in the order the combinations are sorted.

7. The tag management system according to claim 4, wherein the second storing includes sorting, before adding the data and the sort-free identifier in the second table in an associated manner, a plurality of combinations of messages and sort-free identifiers received from the other tag management device in a buffer reserved in a memory, and storing the sort-free identifier and the data included in the message in the second table in the order the combinations are sorted.

8. A computer-readable non-transitory recording medium storing therein a tag management program that causes a computer which includes a data store which stores a plurality of first tables associated with a of plurality of tags and a second table to execute a process comprising:
   adding, to a message including data and a plurality of tags received, a sort-free identifier that identifies receiving order, and are monotonically increasing or monotonically decreasing numbers or character strings arranged in alphabetical order or a combination thereof;
   storing, in receiving order in all first tables associated with each tag that is included in the received message, only the sort-free identifier added at the adding;
   storing, in receiving order in the second table in an associated manner, the sort-free identifier added at the adding and the data which is included in the received message,
   receiving a search request that includes a search condition being constituted using a plurality of tags; and
   executing an inner join that extract the sort-free identifier that is stored in common in the each first table associated with each tag that is included in the received search request when the search condition is AND condition, and executing an outer join extract the sort-free identifier that is stored in either one of the each first table associated with each tag that is included in the received search request when the search condition is OR condition; and
   searching the data associated with the extracted sort-free identifier from the second table.

9. A computer-readable non-transitory recording medium storing therein a tag management program that causes a computer which includes a data store which stores a plurality of first tables associated with a plurality of tags and a second table to execute a process comprising:
   adding, to a message including data and a plurality of tags received from a client terminal, a sort-free identifier that identifies receiving order, and are monotonically increasing or monotonically decreasing numbers or character strings arranged in alphabetical order or a combination thereof;
   determining, on the basis of a value calculated using the added sort-free identifiers, a node that manages accumulation of the data;
   transferring the message and the sort-free identifier to the determined node;
   first storing, in receiving order in all first tables associated with each tag that is included in the received data, only the sort-free identifier added at the adding when a subject tag management device is determined to be a node that manages the accumulation of the message or when the subject tag management device receives the message and the sort-free identifier from another tag management device; and
   second storing, in receiving order in the second table in an associated manner, the sort-free identifier added at the adding and the data in which is included in the received message when a subject tag management device is determined to be a node that manages the accumulation of the message or when a subject tag management device receives the message and the sort-free identifier from another tag management device.

10. The tag management device according to claim 1, wherein,
   the first storing includes generating, when the tag management device does not have the first table associated with a tag that is included in the received message, a new first table associated with the tag and storing the sort-free identifier in the new first table.

11. The tag management system according to claim 4, wherein,
   the first storing includes generating, when the tag management device does not have the first table associated with a tag that is included in the received message, a new first table associated with the tag and storing the sort-free identifier in the new first table.

* * * * *